July 29, 1958  M. E. HODGES ET AL  2,845,581
IMPEDANCE TYPE ELECTRONIC RELAY
Original Filed April 11, 1955
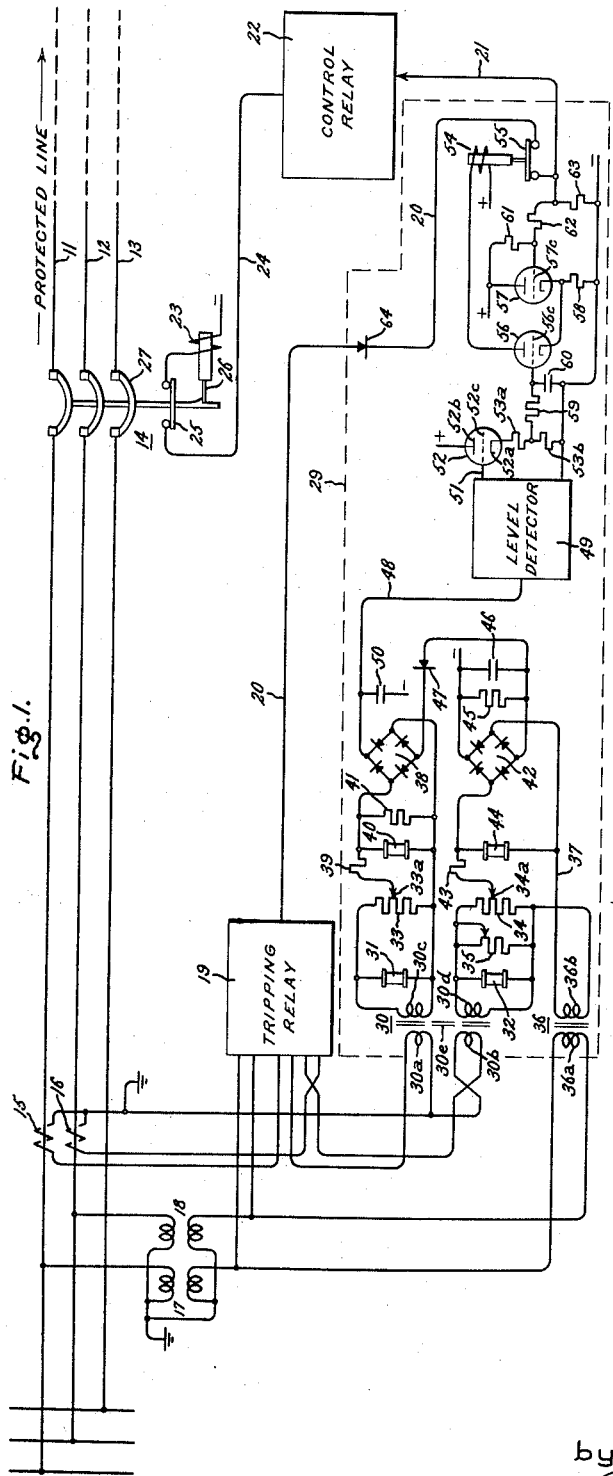
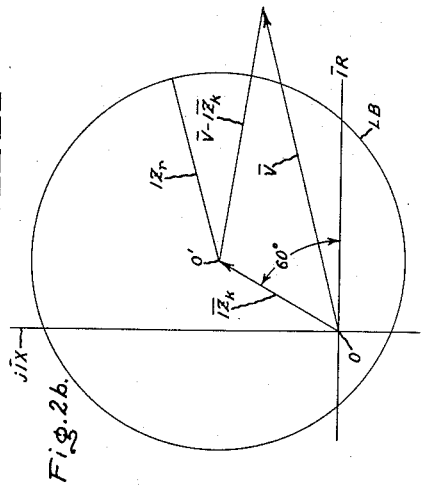
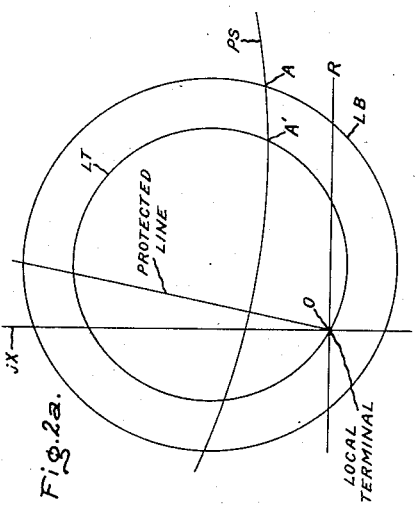
Inventors:
Merwyn E. Hodges,
Harold T. Seeley,
by J. Wesley Haubner
Their Attorney.

United States Patent Office 2,845,581
Patented July 29, 1958

---

2,845,581

IMPEDANCE TYPE ELECTRONIC RELAY

Merwyn E. Hodges, Philadelphia, and Harold T. Seeley, Havertown, Pa., assignors to General Electric Company, a corporation of New York Original application April 11, 1955, Serial No. 500,475. Divided and this application August 8, 1956, Serial No. 602,886

5 Claims. (Cl. 317—36)

This invention relates to an electronic relay, and more particularly to an impedance type electronic relay for initiating a preselected control operation in response to predetermined impedance conditions of an electric power transmission line.

This application is a division of copending patent application S. N. 500,475, Merwyn E. Hodges and Harold T. Seeley, filed on April 11, 1955, and assigned to the present assignee.

The trend today in the field of electric power, principally perhaps for reasons of economy, is to operate high voltage transmission lines at loads which approach system stability limits. In order to maintain stability and preserve continuity of service to the electric power consumers, it is increasingly desirable in present day electric power transmission applications to provide protective relaying systems capable of extremely high speed response. A protective relaying system which will respond to any fault condition on a transmission line within one cycle (based on the typical power system frequency of 60 cycles per second) would contribute greatly to the prevention of major system interruptions and to the mitigation of damage caused by a fault. To avoid the inherent time delay caused by inertia during the operation of conventional electromechanical relays, protective relays employing electronic elements have been designed.

As is well known to those skilled in the art of protective relaying, a high voltage transmission line is usually protected by distance relaying or by a pilot relaying system, or by both. An example of a pilot relaying system wherein extremely high speed electronic relays are used is set forth and claimed in a copending application S. N. 473,802, filed on December 8, 1954, by Merwyn E. Hodges, Norman A. Koss and Harold T. Seeley and assigned to the present assignee. In protecting an electric power transmission line, a relaying problem may be introduced by the effects of power swings, i. e., surges of power in the electric power system resulting from the removal of a fault condition located within the system but external to the protected transmission line, or resulting from the loss of synchronism between a generator and the system. A power swing may cause the fault responsive protective relays to operate. In certain relaying applications it may be desirable to block operation of the relays and thereby prevent tripping of the transmission line circuit breaker during power swings. In other relaying applications it may be desirable to permit relay operation but to block reclosing of the circuit breaker. Accordingly, it is an object of this invention to provide an improved relay for performing a preselected control operation in an electric power transmission line protective relaying system in response to a power swing.

It is a further object of this invention to provide in a protective relaying system employing electronic relays, an improved relay having electronic elements and responsive to an electric power swing for initiating a preselected control operation.

Another object of this invention is to provide a reliable impedance type electronic relay which is exceptionally sensitive and accurate regardless of supply voltage fluctuations or ambient temperature variations.

In carrying out our invention in one form, we provide an impedance type electronic relay for an electric power transmission line. This relay is responsive to an operating quantity comprising a voltage related to the transmission line current by a first preselected constant impedance and a restraining quantity comprising the vectorial difference between a voltage proportional to the transmission line voltage and a voltage related to the line current by another preselected constant impedance. We provide electronic level detecting means to produce output voltage whenever the magnitude of the operating quantity exceeds that of the restraining quantity which indicates that the impedance condition of the transmission line is within the operating region of the relay. The output voltage energizes a selectively controlled time delay circuit which, after a predetermined time interval, performs a preselected control operation, such as blocking the tripping signal of an associated fault detecting relay.

Our invention will be better understood and further objects and advantages will be apparent from the following description taken in conjunction with the accompanying drawing, in which:

Fig. 1 is a schematic diagram, partly in block form, of a transmission line protective relaying system which embodies a preferred form of the impedance type electronic relay; and Figs. 2a and 2b are graphical representations of the operating characteristics of the protective relays illustrated in Fig. 1, with Fig. 2a having impedance coordinates and Fig. 2b having voltage coordinates.

Referring now to Fig. 1, we have shown by way of illustration a 3-phase transmission line, represented by conductors 11, 12, and 13 which is coupled to a supply source of electric power by a 3-pole circuit breaker 14. The transmission line may be of the type employed in an electric power system to conduct 3-phase alternating current of power frequency, such as 60 cycles per second, from the supply source to a remote load, not shown, at a very high voltage, e. g., 330,000 volts phase-to-phase. Although we do not wish to be limited thereto, we have shown in Fig. 1, by way of example, distance relaying equipment arranged to trip circuit breaker 14, thereby disconnecting the transmission line from the supply source, immediately upon the occurrence of a phase fault, i. e., a short circuit between phase conductors at some point along the transmission line, within a predetermined distance from circuit breaker 14. In this manner the transmission line is protected from the damaging effects of prolonged fault current. Circuit breaker 14 and the protective relays illustrated in Fig. 1 are located at what will be referred to hereinafter as the local terminal of the transmission line.

As can be seen in Fig. 1, a pair of instrument current transformers 15 and 16 and a pair of instrument potential transformers 17 and 18 are coupled to a pair of the conductors connecting circuit breaker 14 to the 3-phase supply source. The secondary circuits of these instrument transformers are connected to the protective relays to supply thereto current and voltage quantities which accurately reflect the current and voltage conditions existing at the local terminal. A tripping relay 19, shown in block form, is connected to these instrument transformers and produces an output control signal in response to certain conditions of line current and voltage which indicate that a phase fault has occurred on the protected transmission line. In the illustrated embodiment of our invention, tripping relay 19 is a distance type relay which has been connected to respond to phase faults involving transmission line conductors 11 and 12. It should be understood that by providing an additional current and potential transformer together with two more relays similar to relay 19, the transmission line can be adequately protected for phase-to-phase fault conditions involving any two of its three conductors. There are many suitable distance type relays, of either electronic or the conventional electromechanical construction, that may be used satisfactorily for tripping relay 19. At present we prefer to use an extremely high speed mho type electronic relay such as fully described and claimed in the aforesaid copending patent application S. N. 473,802 filed by Merwyn E. Hodges, Norman A. Koss and Harold T. Seeley. The relay referred to will produce an output control signal of positive unidirectional voltage in less than .014 second in response to a phase fault within its reach.

The output control signal of tripping relay 19 is conveyed by a conductor 20 to a blocking relay 29, and thence by a conductor 21 to a control relay 22. The blocking relay 29 which will be described in detail hereinafter, supervises the output control signal of the tripping relay 19 in a manner and for reasons to be explained below. Control relay 22, which has been shown in block form in Fig. 1, operates to convert the output control signal of relay 19 into a suitable tripping signal for energizing a trip coil 23 of circuit breaker 14, and by means of control relay 22 the output control signal may be utilized to initiate other preselected control functions. Any suitable circuit arrangements may be used for performing this control relay function. An example of suitable circuits employing electronic elements to obtain extremely rapid response is described and claimed in a copending patent application S. N. 471,593, filed on November 29, 1954, by Merwyn E. Hodges and assigned to the present assignee. The tripping signal output of control relay 22 is supplied to trip coil 23 via a conductor 24 and an auxiliary switch 25 of circuit breaker 14. Energization of the trip coil 23 actuates a latch 26 thereby releasing switch member 27 of the circuit breaker for rapid circuit interrupting movement. As switch member 27 moves to its open circuit position, auxiliary switch 25 operates to interrupt tripping current thereby deenergizing trip coil 23.

In certain electric power systems, as a result of power swings, which are power surges such as caused by the removal of a short circuit condition external to the protected transmission line, or by the loss of synchronism between a generator and the system, the tripping relay 19 may operate to give a false indication of a phase fault. It may be desirable to provide means to prevent or block the output control signal of relay 19, thereby preventing tripping of circuit breaker 14, whenever a power swing is in progress, or to provide means to prevent or block reclosing of circuit breaker 14 after it has tripped. To illustrate the effect of a power swing, reference should be made to Fig. 2a which is a conventional impedance diagram. Abscissa R and ordinate $jX$ of Fig. 2a describe values of resistance and inductive reactance respectively as determined by the vectorial relationship between transmission line voltage and current measured at the local terminal. The ratio of transmission line voltage to current defines impedance looking into the transmission line from the local terminal and is designated apparent impedance. Both coordinates R and $jX$ are scaled equally and in the same units, such as ohms, on a phase-to-neutral basis. The transmission line has a determinable impedance which is represented on Fig. 2a, by way of example, as the "protected line." A circle LT represents the locus of impedance values which define the operating limits or reach of a typical mho type distance relay used as tripping relay 19. Whenever the apparent impedance of the transmission line, as indicated by current and voltage quantities supplied to relay 19 by the instrument transformers, falls within the area circumscribed by locus LT, relay 19 will respond to produce an output control signal.

It is well known to those skilled in the art that under normal load conditions the apparent impedance of the transmission line will fall outside the operating region or reach of relay 19 as defined by locus LT, while upon the occurrence of a phase fault condition on the transmission line within a predetermined distance of the local terminal, the apparent impedance will substantially instantaneously change to a value which will cause relay 19 to operate. On the other hand, a unique characteristic of a power swing is that the apparent impedance of the transmission line changes relatively slowly. In other words, the relationship of line voltage and current at the local terminal during a power swing changes at a slow rate while approaching the critical relationship between these quantities, as defined by locus LT, at which tripping relay 19 will operate. The succession of apparent impedance values during a typical power swing has been shown on Fig. 2a, by way of example, by line PS. A measurable length of time is required for the apparent impedance to change from a point such as A to a point A' along line PS during a power swing. To block the output control signal of relay 19 during a power swing, therefore, we provide relay 29, to be described below, which has an operating characteristic, as defined by locus LB, circumscribing locus LT of tripping relay 19. Relay 29 includes a time delay arrangement to delay blocking of the output control signal until after relay 19 has opportunity to perform its tripping function in case of a true fault condition. A similar arrangement, not shown, could be used to block only the reclosing of circuit breaker 14.

In the illustrated embodiment of our invention, the means provided to block or prevent the output control signal of tripping relay 19 from reaching control relay 22 whenever a power swing in the electric power system is in progress comprises an impedance type electronic relay 29. The operating characteristic or reach of this blocking relay has been represented in Fig. 2a, by way of example, by a circle LB which circumscribes circle LT of relay 19. Circle LB is the locus of impedance values which define the operating limits of blocking relay 29. The manner in which the blocking relay operates can best be demonstrated by reference to Fig. 2b, which is a graphical representation of its operating characteristic in terms of voltage. Figure 2b has been constructed by multiplying the ohmic coordinates R and $jX$ of Fig. 2a by current $\bar{I}$ flowing in the transmission line from the supply source toward the load. Abscissa $\bar{I}R$ and ordinate $j\bar{I}X$ of Fig. 2b describe values of resistive and reactive components respectively of voltage produced by current $\bar{I}$.

As can be seen in Fig. 2b, the operating characteristic of blocking relay 29, defined by locus LB, comprises a circle having a radius of $IZr$ wherein $Zr$ is an impedance of predetermined magnitude built into the relay in a manner to be described presently. The origin O' of circle LB is offset from origin O by the vector $\overline{IZk}$, where $\overline{Zk}$ is a predetermined vector impedance built into the relay in a manner to be described presently. The vector $\overline{IZk}$ is disposed at approximately 60 degrees from the $\bar{I}R$ axis. The vector $\bar{V}$ shown in Fig. 2b is a voltage in the relay that represents transmission line voltage at the local terminal during normal load conditions, and accordingly $\bar{V}$ is proportional to current $\bar{I}$ multiplied by the apparent impedance through the load. Within the blocking relay voltage $\overline{IZk}$, which is hereinafter referred to as the offset voltage, is vectorially subtracted from voltage $\bar{V}$ to derive a net voltage $\bar{V}-\overline{IZk}$ which is utilized to restrain operation of the relay. Whenever the magnitude of the net voltage $\bar{V}-\overline{IZk}$ becomes less than voltage IZr, the apparent impedance of the transmission line is within locus LB, and the blocking relay operates to produce a signal voltage.

Since relay 29 in effect responds to a predetermined magnitude of the vector difference between apparent impedance as a predetermined constant impedance, it is an impedance type relay. The voltage signal produced as described above energizes a time delay circuit which, after a predetermined time interval, operates to block the output control signal of tripping relay 19. If a true phase fault occurs on the protected transmission line, both the tripping and blocking relays operate substantially simultaneously, and the output control signal produced by relay 19 is able to pass to control relay 22 by virtue of the time delay added to the blocking operation, thereby causing circuit breaker 14 to trip. But if a typical power swing has caused blocking relay 29 to operate, by the time the apparent impedance of the transmission line has changed from point A to point A' along line PS shown in Fig. 2a, and the mho tripping relay can operate in response thereto, the time delay circuit has operated and passage of the output control signal to control relay 22 is prevented.

The circuitry of a preferred embodiment of the impedance type blocking relay 29 is shown in Fig. 1 and will now be described. As can be seen in Fig. 1, we provide suitable transforming means 30, preferably comprising a pair of primary windings 30a and 30b, a pair of secondary windings 30c and 30d, and a common iron core 30e which has at least one air gap. The primary windings 30a and 30b are connected in the secondary circuits of the 2-phase star-connected current transformers 15 and 16 respectively. These two primary windings have an equal number of turns and are arranged in opposing relationship whereby net ampere turns in the transforming means 30 is determined by the vectorial difference between the transmission line currents flowing in conductors 11 and 12. Thus, the primary windings 30a and 30b effectively simulate a single primary winding supplied by current from delta-connected current transformers. The currents flowing in conductors 11 and 12 during balanced conditions have equal magnitudes but are 120 electrical degrees out-of-phase, and the difference current in these conductors is $\sqrt{3}I$ where I represents the magnitude of current flowing in the conductors.

Transforming means 30 derives across each secondary winding 30c and 30d a voltage representative of the difference current in transmission line conductors 11 and 12 both in magnitude and phase over the operating range of current while imposing minimum burden on current transformers 15 and 16. The magnitude of voltage across each secondary winding and the phase angle by which it leads the net current in the primary windings is determined by the amount of load in the secondary circuits. Open circuit secondary voltages lead the net current by 90 electrical degrees. The effective secondary load resistance in the illustrated embodiment of our invention is preselected to cause the secondary voltages to lead the difference current by 60 electrical degrees. Due to the high percentage of total primary current used for magnetizing iron core 30e and its air gap, initial transient D.-C. offset in fault current wave form will not be appreciably reproduced in the secondary voltage. The transforming means 30 also serves as a desirable means for insulating succeeding relay circuits from the current transformer connections.

Because the succeeding relaying circuits are designed to operate over a wide range of current magnitudes, it is possible that during a fault condition of maximum current an extremely large voltage may be induced in the secondary windings 30c and 30d. To prevent injury to the insulation of the secondary windings which might otherwise be damaged by such a large voltage, voltage limiters 31 and 32 are connected across secondary windings 30c and 30d respectively. Each voltage limiter has a non-linear current-voltage characteristic, that is, the ohmic value of the limiter decreases with increasing voltage applied across it so that current will increase at a greater rate than voltage. Many such non-linear current-voltage characteristic devices are known in the art, and for the purposes of the illustrated embodiment of our invention we prefer at present to use a special ceramic resistance material comprising silicon carbide crystals held together by a suitable binder, such as described and claimed in U. S. Patent 1,822,742, issued to Karl B. McEachron on September 8, 1931. Each limiter, 31 or 32, provides means for increasing secondary load as the respective secondary voltage increases thereby limiting the maximum possible peak value of secondary voltage to a safe level without interfering with measurement accuracy at the normally smaller values of voltage.

Transforming means 30 is loaded by an adjustably tapped resistor 33 connected across secondary winding 30c. The voltage appearing across the tapped portion of resistor 33, as determined by the position of a slider 33a, has a fixed relationship to the difference current producing this voltage. This fixed relationship is in units of ohms and is termed "replica impedance." The particular magnitude of this replica impedance is Zr. During balanced system conditions, the magnitude of voltage across the tapped portion of resistor 33 is $\sqrt{3}IZr$. It should be recognized that this voltage divided by $\sqrt{3}$ is the radius of the circle characteristic of the impedance relay as shown in Fig. 2b. (The coordinates of Figs. 2a and 2b are scaled on the conventional phase-to-neutral basis, i. e., values of impedance and voltage respectively, are measured along one conductor from the local terminal to the neutral point of the load. Since the apparent impedance of the transmission line is necessarily measured on a phase-to-phase basis, it is necessary, during balanced conditions, to use a conversion factor of $1/\sqrt{3}$ when reproducing the voltage quantities detected at the local terminal on the graphical representation of Fig. 2b.) Slider 33a is adjusted to obtain the desired magnitude of Zr, which magnitude, for the purposes of the illustrated embodiment of our invention, preferably is equal to about ¾ the impedance of the transmission line protected by tripping relay 19.

As shown in Fig. 1, transforming means 30 is loaded by another adjustably tapped resistor 34 connected across secondary winding 30d. In addition, a rheostat 35 is provided across winding 30d to permit a shift of the phase relationship of derived voltage with respect to the net current in the primary windings. The fixed relationship of voltage appearing across the tapped portion of resistor 34 to the difference current producing this voltage is replica impedance $\vec{Z}k$. The voltage across the tapped portion of resistor 34 is $\sqrt{3}\vec{I}\vec{Z}k$ during balanced conditions. It should be recognized that this voltage vector divided by $\sqrt{3}$ determines the location of the center O' of the circle characteristic LB as shown in Fig. 2b in terms of phase-to-neutral voltage. The resistance value of rheostat 35 is selected to obtain the desired phase angle characteristic of replica impedance $\vec{Z}k$, and a slider 34a of tapped resistor 34 is adjusted to obtain the desired magnitude of $\vec{Z}k$. For the purposes of the illustrated embodiment of our invention, a phase angle of 60 degrees and a magnitude of approximately ½ the diameter of circle LT permit an adequate and consistent margin to be maintained between locus LB and the locus LT of a typical mho type tripping relay. By making $\vec{Z}k$ equal to zero, the center of locus LB could be shifted to the origin O of Fig. 2b.

The voltage between transmission line conductors 11 and 12 is supplied via the 2-phase star-connected potential transformers 17 and 18 to suitable transforming means 36 in the impedance blocking relay 29. This transforming means comprises, for example, an iron core transformer 36 having a primary winding 36a connected to potential transformers 17 and 18 and a secondary winding 36b as illustrated in Fig. 1. Transformer 36 derives across its secondary winding a voltage which represents the transmission line voltage between conductors 11 and 12 both in magnitude and phase, and also insulates succeeding relay circuits from the potential transformer connections. During balanced system conditions the derived voltage is $\sqrt{3}\overline{V}$, where $\overline{V}$ is directly proportional to the transmission line phase-to-neutral voltage. One terminal of secondary winding 36b is connected to a lead 37 and the other terminal is coupled to tapped resistor 34 in a manner to develop between lead 37 and slider 34a a net voltage comprising voltage $\sqrt{3}\overline{IZk}$ subtracted from voltage $\sqrt{3}\overline{V}$. The magnitude of net voltage $\sqrt{3}(\overline{V-IZk})$ appearing between lead 37 and slider 34a divided by $\sqrt{3}$ has been shown in Fig. 2b.

During a power swing the electric power system will remain substantially in balance, and, therefore, we obtain correct operation of the impedance blocking relay by supplying it with the current and voltage quantities derived from conductors 11 and 12 only. For convenience, hereafter in this specification we will refer to the voltage across the tapped portion of resistor 33 merely as IZr, and the voltage between slider 34a and lead 37 merely as $\overline{V-IZk}$. The succeeding relay circuits respond to the relative magnitude of these voltages, as will be apparent from the following description.

Voltage IZr is utilized to operate the impedance blocking relay. This voltage is supplied to suitable rectifying means, such as the full-wave bridge type rectifier 38 illustrated in Fig. 1, where it is converted to a more useful unidirectional operating voltage. A voltage limiting circuit comprising a resistor 39 and a voltage limiter 40 is provided between resistor 33 and rectifier 38 to protect the rectifier from damaging high voltage levels. Limiter 40 may be similar to limiters 31 and 32 described above. As voltage IZr rises to excessively high values, the resistance of limiter 40 becomes less and a nonlinearly increasing voltage drop is produced across resistor 39 thereby limiting the voltage level at rectifier 38. A loading resistor 41 is connected in parallel with voltage limiter 40 to reduce the magnitude of voltage available at rectifier 38 by a fixed percentage of IZr during normal, relatively low voltage levels. This fixed percentage is selected so that the magnitude of the unidirectional operating voltage will be just equal to the resulting magnitude of restraint voltage, which appears across resistor 45 as explained below, whenever the magnitude of $\overline{V-IZk}$ is equal to IZr.

Voltage $\overline{V-IZk}$ is utilized to restrain operation of the impedance blocking relay. This voltage is supplied to suitable rectifying means, such as the full-wave bridge type rectifier 42 illustrated in Fig. 1, where it is converted to a more useful unidirectional voltage. A voltage limiting circuit comprising a resistor 43 and a voltage limiter 44, similar respectively to resistor 39 and voltage limiter 40 described above, is provided between tapped resistor 34 and rectifier 42 to protect the rectifier from damaging high voltage levels. A resistor 45 is connected between the positive and negative D.-C. terminals of rectifier 42. The positive D.-C. terminal of rectifier 42 is connected to a negative bus represented by the symbol (−). (The symbols + and − are used throughout the drawing to represent the positive bus and negative bus respectively of a unidirectional supply voltage source, such as a battery, which has not been shown for the sake of drawing simplicity.) The unidirectional voltage appearing across resistor 45 is smoothed by a filter capacitor 46, and this voltage, which comprises the restraint voltage of the blocking relay, is related to $\overline{V-IZk}$ by substantially the same fixed percentage that was referred to above in connection with the operating voltage.

The negative terminal of rectifier 42 is coupled to the negative terminal of rectifier 38 through a one-way electric valve or rectifier 47 which permits direct current flow only in a direction toward rectifier 38. The positive D.-C. terminal of rectifier 38 is connected by a lead 48 to the input circuit of a level detector 49 which has been shown in block form in Fig. 1. For the purposes of this specification the term level detector is used to designate a device such as an electronic switch, i. e., means responsive to an input signal of at least a predetermined instantaneous value for producing substantially instantaneously an output signal of predetermined constant characteristic. Any suitable circuit can be used for level detector 49. For example, a particularly well suited circuit arrangement is shown in Fig. 1 of a copending patent application S. N. 500,475 filed on April 11, 1955, by Merwyn E. Hodges and Harold T. Seeley and assigned to the present assignee. This circuit, which is described in detail and claimed in the aforementioned application, has the desirable features of extremely fast pickup and cutoff times, selectable pickup with respect to input signal level, and a high degree of accuracy which is maintained during fluctuations of supply voltage and variations of ambient temperature. The input circuit of level detector 49 provides a D.-C. path from lead 48 to negative bus. Thus, a closed path or loop for direct current flow is formed by negative bus, rectifiers 42 and 38, and the input circuit of level detector 49. Since the operating and restraining voltages are applied in opposition, direct current will flow into the input circuit of level detector 49 and develop a positive unidirectional signal voltage between lead 48 and negative bus only when the magnitude of operating voltage is greater than the magnitude of restraining voltage. Level detector 49 produces a large magnitude output voltage substantially instantaneously when energized by only a very small predetermined magnitude of this positive signal voltage.

A filter capacitor 50 is connected between lead 48 and negative bus and smooths the signal voltage. Rectifier 47 prevents direct current flow in the closed loop as long as the magnitude of restraining voltage is greater than the magnitude of operating voltage, as is the case under normal system conditions. Therefore, filter capacitor 50 normally has no charge, and when system conditions change so that operating voltage exceeds restraining voltage, the time required by capacitor 50 to charge from zero to the predetermined magnitude of signal voltage can be accurately taken into account in determining the overall operating time of the relay.

The operation of blocking relay 29 to produce an output voltage at level detector 49 will now be summarized. Assume that a power swing has caused the transmission line apparent impedance to come within the operating region of the relay as defined by locus LB. The vector $\overline{V}$ representing transmission line voltage minus the offset voltage $\overline{IZk}$ will then have less magnitude than the resulting transmission line current I multiplied by the predetermined constant impedance Zr. Consequently, the restraining voltage across resistor 45 is less than the operating voltage output of rectifier 38 and a positive signal voltage is produced thereby energizing level detector 49. Zr and $\overline{Zk}$ have been selected whereby locus LB is substantially concentric with the mho tripping relay locus LT, as can be seen in Fig. 2a, and whereby the margin maintained between these circles is sufficient to permit proper operation of the time delay circuit, described below, during any power swing.

As can be seen in Fig. 1, the output voltage of level detector 49 is conveyed by a lead 51 to a control grid 52c of a cathode follower vacuum tube 52. Cathode 52a of tube 52 is connected to negative bus through a cathode resistor 53 comprising a pair of voltage dividing resistors 53a and 53b. The cathode heater and heater circuits, being well known to those skilled in the art, have been omitted for the sake of drawing simplicity. The anode or plate of tube 52 is connected directly to positive bus. The output voltage of level detector 49 energizes control grid 52c which causes conduction in tube 52 to increase from its quiescent value. A resultant unidirectional voltage drop is developed across cathode resistor 53, and the portion of this resultant voltage appearing across resistor 53b provides an input signal for the succeeding time delay circuit.

The time delay circuit of the impedance blocking relay operates an electromagnetic relay 54. A normally closed permissive contact 55 of relay 54 interconnects conductors 20 and 21 whereby the output control signal of tripping relay 19 is conveyed to control relay 22. Thus, the output control signal can be blocked by energizing relay 54 to open permissive contact 55. Although other suitable time delay circuits may be used, we have illustrated a selectively controlled time delay circuit described and claimed in the aforesaid copending application of Merwyn E. Hodges, S. N. 471,593. In this circuit two triode vacuum tubes, 56 and 57, are provided to control the energization of electromagnetic relay 54. Tube 56 operates to energize relay 54 while tube 57 operates to suppress or disable tube 56 thereby preventing energization of relay 54. The plate of tube 56 is connected through the operating coil of relay 54 to positive bus, and the cathode of tube 56 is connected through a cathode resistor 58 to negative bus. The input signal taken from resistor 53b supplies the control grid 56c of tube 56 through an R-C time delay circuit comprising resistor 59 and capacitor 60.

The plate of tube 57 is connected directly to positive bus while the cathode of tube 57 is connected through the common cathode resistor 58 to negative bus. The control grid 57c of tube 57 normally is supplied by a positive voltage derived from a voltage dividing network connected between positive and negative buses comprising a resistor 61 in series circuit with a resistor 62 in series circuit with a resistor 63 which is in parallel with the impedances to negative bus of the circuits in control relay 22 coupled to conductor 21. Grid 57c is connected to the common point of resistors 61 and 62, and the terminal of permissive contact 55 coupled to conductor 21 is connected to the common point between resistors 62 and 63. The positive voltage on grid 57c renders tube 57 slightly conductive. As a result, under normal system conditions, sufficient current flows through cathode resistor 58 to raise the potential of the cathode of tube 56 to a value whereby tube 56 is biased to cutoff.

As soon as the impedance relay operates to produce an input signal, the grid voltage of tube 56 increases with time delay to the full magnitude of the signal, and tube 56 soon conducts sufficient current to energize electromagnetic relay 54 thereby opening permissive contact 55. The period of delay in energizing relay 54 is necessary when a true phase fault has occurred on the protected transmission line to permit the output control signal of tripping relay 19 to pass to control relay 22 and complete its tripping function before permissive contact 55 opens. After electromagnetic relay 54 has been energized, a subsequent output control signal from the tripping relay, such as caused by the apparent impedance reaching locus LT during the power swing, will be blocked by the open circuit at permissive contact 55. The overall operating time required by blocking relay 29 to open permissive contact 55 is selected to be less than the time required for the transmission line apparent impedance to change from a value on locus LB to a value on locus LT (for example, from point A to point A' in Fig. 2a) during any power swing in the particular electric power system. This overall operating time also is selected to be longer than the time required by tripping relay 19 to produce its output control signal and by control relay 22 to respond thereto whenever any phase fault occurs within the reach of relay 19.

In the case of a true fault, the positive polarity output control signal of relay 19, which has a magnitude greater than that of the input signal produced in the impedance blocking relay 29, is supplied to grid 57c through permissive contact 55 before electromagnetic relay 54 is energized. Tube 57 is immediately driven to full conduction, and the resulting rise in voltage level across cathode resistor 58 will bias tube 56 whereby conduction is suppressed even with full voltage on grid 56c. In this manner, energization of relay 54 is prevented during any phase fault on the protected line, and the output control signal of tripping relay 19 is transmitted by conductors 20 and 21 to control relay 22 whereby circuit breaker 14 is tripped. Resistor 62 is required to prevent undesirable loading of the output control signal by the grid circuit of tube 57. A rectifier 64 in conductor 20 isolates the internal circuits of tripping relay 19 from the voltages in the grid circuit of tube 57.

By providing another normally closed permissive contact of electromagnetic relay 54 in the closing circuit of circuit breaker 14, and by connecting conductor 21 directly to conductor 20, tripping of circuit breaker 14 can be permitted and reclosing blocked in response to a power swing.

Although we have shown by way of illustration a preferred embodiment of our impedance type blocking relay in a protective relaying application employing distance relays, it should be understood that there are other applications for which our blocking relay is particularly well suited. For example, the blocking relay can be used in the directional-comparison pilot type protective relaying system described and claimed in the aforesaid copending application of Merwyn E. Hodges, Norman A. Koss and Harold T. Seeley, S. N. 473,802.

While we have shown and described a preferred form of our invention by way of illustration, many modifications will occur to those skilled in the art. We, therefore, contemplate in the appended claims to cover all such modifications as fall within the true spirit and scope of our invention.

What we claim as new and desire to secure by Letters Patent of the United States is:

1. In a fault detecting protective relay arrangement for a polyphase alternating current electric power system having a circuit interrupter including electroresponsive tripping means, electronic fault detecting means for deriving a first voltage signal in response to a first predetermined range of relationships between alternating voltage and current derived from the power system, first control means, a normally deenergized electroresponsive device interconnecting said fault detecting means and said first control means for conveying said first voltage signal to said first control means, said first control means being responsive to said first voltage signal to energize said tripping means, means for producing a second voltage signal in response to a second predetermined range of relationships between alternating voltage and current derived from the power system, said second predetermined range including said first predetermined range, second control means responsive to said second voltage signal after a predetermined time interval to operably energize said electroresponsive device to prevent the conveyence of said first voltage signal to said first control means, third control means connected to said second control means and operable when energized by said first voltage signal to disable said second control means thereby preventing energization of said electroresponsive device, and coupling means supplying said first voltage signal to said third control means and including permissive means responsive to operation of said electroresponsive device to prevent energization of said third control means.

2. An impedance type relay in an alternating current electric power system comprising, means responsive to alternating current derived from the system for producing a unidirectional operating voltage, means responsive to alternating current derived from the system for developing an alternating voltage related to said alternating current by a predetermined impedance, means responsive to the vectorial difference between said developed voltage and an alternating voltage derived from the system or to said derived alternating voltage alone in the absence of said developed voltage for producing a unidirectional restraining voltage, means responsive to the difference between said operating and restraining voltages for producing an energizing signal whenever the difference voltage is more positive than a predetermined value, an electroresponsive device, first control means responsive to said energizing signal to operably energize said electroresponsive device, control voltage supply terminals, second control means connected to said first control means and operable when energized by control voltage to disable said first control means, and coupling means connecting said supply terminals to said second control means and including permissive means for controlling energization of said second control means in preselected response to operation of said electroresponsive device.

3. An impedance type relay in an alternating current electric power circuit comprising, relay means responsive to an operating electric quantity related to the alternating current in said power circuit by a first predetermined impedance and responsive to a restraining electric quantity comprising the vectorial difference between a voltage proportional to the voltage of said power circuit and a voltage related to said alternating current by another predetermined impedance, said relay means being operable to produce an energizing signal whenever the difference between the values of said operating and restraining quantities exceeds a predetermined value, an electromagnetic device, first control means for energizing said electromagnetic device in delayed response to said energizing signal, second control means connected to said first control means operable when energized to disable said first control means thereby preventing energization of said electromagnetic device, control voltage supply terminals, coupling means interconnecting said supply terminals and said second control means, whereby said second control means is energized by the control voltage, and permissive means controlled by said electromagnetic device to prevent energization of said second control means whenever said electromagnetic device is energized.

4. In a fault detecting protective relay arrangement for an alternating current electric power system, fault detecting means operable substantially instantaneously in response to a first predetermined range of relationships between alternating voltage and current derived from the power system to produce a first voltage signal, means including a normally deenergized electroresponsive device connected to said fault detecting means for utilizing said first voltage signal to initiate a preselected control function, relay means operable in response to a second predetermined range of relationships between alternating voltage and current derived from the power system to produce a second voltage signal, said second predetermined range including said first predetermined range, first control means connected to said relay means and operable after a predetermined time interval when energized by said second voltage signal to operably energize said electroresponsive device thereby to prevent the utilization of said first voltage signal for initiating the preselected control function, second control means, and permissive means comprising a normally closed switch contact controlled by said electroresponsive device to connect said second control means to said fault detecting means for energization by said first voltage signal and to disconnect said second control means upon operation of said electroresponsive device, said second control means being operable substantially instantaneously in response to energization by said first voltage signal to disable said first control means thereby preventing operable energization of said electroresponsive device.

5. In a fault detecting protective relay arrangement for an alternating current electric power system having a circuit interrupter provided with electroresponsive closing and tripping means, fault detecting means operable substantially instantaneously in response to a first predetermined range of relationships between alternating voltage and current derived from the power system to produce a first voltage signal, means connected to said fault detecting means for utilizing said first voltage signal to energize the tripping means thereby tripping the circuit interrupter, a normally deenergized electroresponsive device having a switch contact connected to supervise the closing means of the circuit interrupter, relay means operable in response to a second predetermined range of relationships between alternating voltage and current derived from the power system to produce a second voltage signal, said second predetermined range including said first predetermined range, first control means connected to said relay means and operable after a predetermined time interval when energized by said second voltage signal to operably energize said electroresponsive device thereby to prevent closing of the circuit interrupter, second control means, and permissive means connected to said fault detecting means and controlled by said electroresponsive device for supplying said first voltage signal to said second control means only while said electroresponsive device is in its normally deenergized condition, said second control means being operable substantially instantaneously in response to energization by said first voltage signal to disable said first control means thereby preventing operable energization of said electroresponsive device.

References Cited in the file of this patent
UNITED STATES PATENTS

| | | |
|---|---|---|
| 2,509,025 | Warrington | May 23, 1950 |
| 2,511,680 | Warrington | June 13, 1950 |